United States Patent
Ok et al.

(10) Patent No.: US 8,274,527 B2
(45) Date of Patent: Sep. 25, 2012

(54) METHOD AND APPARATUS FOR CONVERTING COLOR SPACES AND MULTI-COLOR DISPLAY APPARATUS USING THE COLOR SPACE CONVERSION APPARATUS

(75) Inventors: Hyunwook Ok, Yongin-si (KR); Seongdeok Lee, Suwon-si (KR); Wonhee Choe, Gyeongju-si (KR); Changyeong Kim, Yongin-si (KR); Dusik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1035 days.

(21) Appl. No.: 11/064,951

(22) Filed: Feb. 25, 2005

(65) Prior Publication Data

US 2005/0190967 A1 Sep. 1, 2005

(30) Foreign Application Priority Data

Feb. 26, 2004 (KR) ........................ 10-2004-0012989

(51) Int. Cl.
*G09G 5/02* (2006.01)
(52) U.S. Cl. ....................................... 345/600; 345/603
(58) Field of Classification Search .................. 348/571, 348/34; 345/604, 600, 603; 382/167
See application file for complete search history.

(56) References Cited

U.S. PATENT DOCUMENTS

| | | | |
|---|---|---|---|
| 5,293,258 A * | 3/1994 | Dattilo | 358/518 |
| 5,402,245 A * | 3/1995 | Motta et al. | 358/1.9 |
| 6,097,367 A | 8/2000 | Kuriwaki et al. | |
| 6,191,826 B1 | 2/2001 | Murakami et al. | |
| 6,259,430 B1 | 7/2001 | Riddle et al. | |
| 6,262,744 B1 | 7/2001 | Carrein | |
| 6,633,302 B1 | 10/2003 | Ohsawa et al. | |
| 2002/0041288 A1 * | 4/2002 | Myers | 345/602 |
| 2002/0149546 A1 * | 10/2002 | Ben-Chorin et al. | 345/32 |
| 2003/0007164 A1 * | 1/2003 | Lee et al. | 358/1.9 |
| 2003/0007686 A1 * | 1/2003 | Roever | 382/167 |

(Continued)

FOREIGN PATENT DOCUMENTS

JP 6-261332 9/1994

(Continued)

OTHER PUBLICATIONS

Chinese Office Action issued Jun. 1, 2007 in corresponding Chinese Patent Application No. 2005100628083.

*Primary Examiner* — Maurice L McDowell, Jr.
(74) *Attorney, Agent, or Firm* — Staas & Halsey LLP

(57) ABSTRACT

A method and apparatus for converting an m-dimensional color space comprising first through m-th input color components to an n-dimensional color space comprising first through n-th output color components. specified A method of converting an m-dimensional color space having first through m-th input color components into an n-dimensional color space having first through n-th output color components, m being less than n, includes: extracting first through nth intermediate color components by linearly combining the first through m-th input color components; determining whether m+1-th through n-th intermediate color components are within a specified dynamic range and compensating the first through n-th intermediate color components when signal values of the m+1-th through n-th intermediate color components are not within the dynamic range to obtain the first through n-th output color components.

32 Claims, 6 Drawing Sheets

U.S. PATENT DOCUMENTS

| | | |
|---|---|---|
| 2003/0025835 A1 | 2/2003 | Segman |
| 2004/0100640 A1* | 5/2004 | Saito .............................. 358/1.1 |
| 2004/0165081 A1* | 8/2004 | Shibaki et al. ............. 348/222.1 |

FOREIGN PATENT DOCUMENTS

| | | |
|---|---|---|
| JP | 2000-338950 | 12/2000 |
| WO | 98/58493 | 12/1998 |
| WO | WO 01/95544 | 12/2001 |
| WO | WO 02/099557 | 12/2002 |
| WO | WO 02/099776 | 12/2002 |
| WO | WO 02/101644 | 12/2002 |

* cited by examiner

METHOD AND APPARATUS FOR CONVERTING COLOR SPACES AND MULTI-COLOR DISPLAY APPARATUS USING THE COLOR SPACE CONVERSION APPARATUS

CROSS-REFERENCE TO RELATED APPLICATION

This application claims the benefit of Korean Patent Application No. 10-2004-0012989, filed on Feb. 26, 2004, in the Korean Intellectual Property Office, the disclosure of which is incorporated herein by reference.

BACKGROUND OF THE INVENTION

1. Field of the Invention

The present invention relates to an image processing method, and more specifically, to a method and apparatus for compensating output color components so that a dynamic range of the color components is within a specified range by using a simple algorithm.

2. Description of Related Art

As electronic engineering advances, electronic information provided to users not only includes simple text, but also various forms of multimedia information. The multimedia information provided to users includes still images, moving pictures, animation and sound as well as text information. Above all, moving pictures are very important since they are essential to next generation Video On Demand (VOD) services as well as interactive services. Thus, much work has been done on the standardization of moving pictures.

Further, analog data is now becoming digitalized as a result of advances of digital electronics and various digital image processing techniques have been introduced to deal with vast amount of digital image data effectively. There are several merits of digital image processing. First, analog image information is degraded during processing since noise is inevitably added to an original signal. However, digital image information is less susceptible to noise. Second, digitalized image information can easily be processed by computers and image compression becomes possible due to computer-based image processing.

Generally, digital image processing relates to displaying recorded analog images using computers. Digital image processing was realized by Digital Video Interactive (DVI) technology, which was first introduced in the late 1980's. DVI technology is used to perform sophisticated tasks, which cannot be performed in real time by low performance processors, by using a graphics processor designed for image processing.

In addition, Junction Pictures Experts Group (JPEG) and Motion Pictures Experts Group (MPEG) produced a new coding standard superior to DVI, and it is anticipated that this coding standard will play a major role in digital image processing since it is supported by most companies related to the field. The MPEG standard is still being updated, for example, MPEG II and MPEG III standards have been developed, in order to realize high quality images such as high definition television (HDTV) on personal computers.

Furthermore, image processing techniques which only require main processors rather than separate hardware to process images have been introduced since 1991, and such techniques include QUICKTIME® developed by APPLE CORP., Video for WINDOWS® developed by MICROSOFT CORP., and INDEO® developed by INTEL CORP. These techniques are very useful for personal computers since they are not a large burden on main processors thereof.

As various digital image processing techniques are studied, standardization of these techniques is also required. By way of standardization, many techniques can be compatible with one another so that many applications such as video conferencing, digital broadcasting systems and video phones can be realized. For example, a digital image compression technique used to store information on a recording medium such as a CD-ROM or an optical disk is compatible with a compression technique used for video conferencing.

Conventional image signals are processed in a 3-dimensional color space represented by Red (R), Green (G) and Blue (B) color components (collectively RGB colors) generated by using optical sources. Because RGB colors are primary colors constituting all colors, image signals can be displayed by using these 3 colors.

FIG. 1 is a Venn diagram illustrating a relationship among primary colors used for expressing colors.

Referring to FIG. 1, every color signal can be produced by combining the RGB colors. That is, R combined with G represents a Yellow (Y) signal, G with B represents a Cyan (C) signal, and B and R represents a Magenta (M) signal. When all primary colors are mixed, white light (W) is generated.

FIG. 2 illustrates a wavelength relationship between RGB and CMY color components.

Referring to FIG. 2, R light has the longest wavelength, while B signal has the shortest. Y light has a wavelength between the wavelengths of those of G and R lights. In a similar way, C light has a wavelength between the wavelengths of G and B lights while M light has a wavelength between the wavelengths of B and R lights. Therefore, CMY signals can be produced by mixing two different primary colors.

FIG. 3 is a color diagram of RGB and CMY color components.

The color diagram can be simplified into two triangles, one of which has RGB points as its apexes (RGB triangle), and the other of which has CMY as its apexes (CMY triangle). In this case, all color coordinates in the RGB triangle can be represented as a combination of R, G and B color signals. Similarly, all color coordinates in the CMY triangle can be represented as a combination of C, M and Y color signals. However, a color coordinate which lies outside of each triangle cannot be represented by a combination of color signals corresponding to the triangle. For example, color coordinates outside the RGB triangle (the dashed area in FIG. 3) cannot be expressed using R, G and B. Accordingly, color coordinates outside the CMY triangle cannot be expressed using C, M and Y. Therefore, a wider color gamut can be expressed as more optical sources are used. The color gamut is especially important for displaying high quality images.

As a result, a multi-color display having more than 3 color sources has been introduced.

FIG. 4A schematically illustrates the operation of a conventional 3-color display.

In FIG. 4A, a conventional 3-color display device represents an image by using 3-dimensional color components ($R_0$, $G_0$, $B_0$).

FIG. 4B schematically illustrates the operation of a conventional multi-color display apparatus. Compared to the 3-color display of FIG. 4A, the multi-color display converts input signals to 6-dimensional color components ($R_0$, $G_0$, $B_0$, C, M, Y) and reproduces the converted signal using 6 color sources.

Examples of conventional techniques introduced to convert input signals to multi-color components are as follows. First, U.S. Pat. No. 6,633,302, issued to Olympus Optical Co., Ltd., discloses a method of color conversion using an XYZ color space. That is, in the method, a look up table is used to compress a color range of colors outside the XYZ color range. However, this method is hard to implement when more than 5 color sources are used. second, a Genoese company has introduced a method in which performs color mapping from a 3-dimensional look up table to a 2-dimensional look up table is performed using spectral data. In addition, a 1-dimensional look up table is used to adapt sizes of 2-dimensional color ranges. This method has a drawback that calculating look up tables is troublesome. Furthermore, output quality can be degraded since the maximum chromaticness and brightness expressed by each display are different.

Therefore, a simple method for converting RGB color components into 6 color components comprising RGB and CMY while preventing degradation of an input image and maintaining maximum chromaticness and brightness is required.

BRIEF SUMMARY

Aspects of the present invention provide a simplified method and apparatus for converting an input color space to a higher-dimensional output color space.

Aspects of the present invention also provide a color space converting apparatus which can express colors with a maximum saturation and brightness of a display.

Aspects of the present invention also provide a display apparatus displaying output color components included in an output color space converted from an input color space having less dimensions than the output color space.

According to an aspect of the present invention, there is provided a method of converting an m-dimensional color space having first through m-th input color components to an n-dimensional color space comprising first through n-th output color components (m<n) including: extracting first through nth intermediate color components by linearly combining the first through m-th input color components; determining whether the m+1-th through n-th intermediate color components are within a specified dynamic range; and compensating the first through n-th intermediate color components when signal values of the m+1-th through n-th intermediate color components are not within the dynamic range to obtain the first through n-th output color components.

The extracting the first through nth intermediated color components may include: determining a first coefficient group used to calculate the first through m-th intermediate color components by linearly combining the first through m-th input color components; determining a second coefficient group used to calculate the m+1-th through n-th intermediate color components by linearly combining the first through m-th input color components; and calculating the first through n-th intermediate color components using the first through m-th input color components and the first and second coefficient groups. The calculating the first through n-th intermediate color component may include: calculating the dynamic range of the m+1-th through n-th intermediate color components; determining a scaling ratio for scaling the dynamic range of the m+1-th through n-th intermediate color components; and scaling the m+1-th through n-th intermediate color components using the scaling ratio. The determining the scaling ratio may include: determining the grayscale of the first through m-th input color components using a specified algorithm and determining the scaling ratio such that the scaling ratio is complementary to the grayscale. The grayscale may be calculated using (the maximum of the first through m-th input color components—the minimum of the first through m-th input color components) divided by the maximum of the first through m-th input color components, and the scaling ratio is calculated using (1−p*grayness), where p satisfies 0<p<1.

According to another aspect of the present invention, there is provided an apparatus for converting an m-dimensional color space comprising first through m-th input color components to an n-dimensional color space comprising first through n-th output color components (m<n) including: an intermediate color component extractor extracting first through nth intermediate color components by linearly combining the first through m-th input color components; a dynamic range comparator determining whether the m+1-th through n-th intermediate color components are within a specified dynamic range; a color component compensator compensating the first through n-th intermediate color components when signal values of the m+1-th through n-th intermediate color components are not within the dynamic range to obtain the first through n-th output color components; and a central controller controlling the intermediate color component extractor, the dynamic range compensator and the color component compensator.

The intermediate color component extractor may include: a first coefficient group determiner determining a first coefficient group used to calculate the first through m-th intermediate color components by linearly combining the first through m-th input color components; and a second coefficient group determiner determining a second coefficient group used to calculate the m+1-th through n-th intermediate color components by linearly combining the first through m-th input color components, new line, and the central controller calculates the first through n-th intermediate color components using the first through m-th input color components and the first and second coefficient groups.

The intermediate color component extractor further may include a scaling ratio determiner determining a scaling ratio for scaling the dynamic range of the m+1-th through n-th intermediate color components and the central controller scales the m+1-th through n-th intermediate color components using the scaling ratio. The scaling ratio determiner may determine the grayscale of the first through m-th input color components using a specified algorithm and determines the scaling ratio such that the scaling ratio is complementary to the grayscale. The grayscale may be calculated using (the maximum of the first through m-th input color components—the minimum of the first through m-th input color components) divided by the maximum of the first through m-th input color components, and the scaling ratio is calculated using (1−p*grayness), where p satisfies 0<p<1.

According to another aspect of the present invention, there is provided a color display apparatus for displaying an image signal including: first through n-th output color components, comprising: an intermediate color component extractor extracting first through n-th intermediate color components by linearly combining first through m-th input color components (m<n); a dynamic range comparator determining whether the m+1-th through n-th intermediate color components are within a specified dynamic range; a color component compensator compensating the first through n-th intermediate color components when signal values of the m+1-th through n-th intermediate color components are not within the dynamic range, to obtain the first through n-th output color components; a display unit including n optical sources emitting light of wavelength corresponding to the n output color components; and a central controller controlling the intermediate color component extractor, the dynamic range compensator and the color component compensator.

The intermediate color component extractor may include: a first coefficient group determiner determining a first coefficient group used to calculate the first through m-th intermediate color components by linearly combining the first through m-th input color components; a second coefficient group determiner determining a second coefficient group used to calculate the m+1-th through n-th intermediate color components by linearly combining the first through m-th input color components; and a scaling ratio determiner determining a scaling ratio used to scale the dynamic range of the m+1-th through n-th intermediate color components, and the central controller calculates the first through n-th intermediate color components using the first through m-th input color components and the first and second coefficient groups, and scales the m+1-th through n-th intermediate color components by using the scaling ratio. The scaling ratio determiner may determine the grayscale of the first through m-th input color components using (the maximum of the first through m-th input color components—the minimum of the first through m-th input color components) divided by the maximum of the first through m-th input color components, and the scaling ratio is calculated using (1−p*grayness), where p satisfies 0<p<1. The color component compensator may include: a small color component compensator compensating color components less than the first specified value when more that one of the m+1-th through n-th intermediate color components are less than a first specified value and a big color component compensator compensating color components greater than the second specified value when more that one of the m+1-th through n-th intermediate color components are greater than a second specified value. The small color component compensator may add the absolute value of the color component less than the first specified value to the m+1-th through n-th intermediate color components, add the absolute value of the color component less than the first specified value to a complementary color component complementary to the color component less than the first specified value and set the value of the color component less than the first specified value to the first specified value. The big color component compensator may divide values of the m+1-th through n-th intermediate color components by a value of the color component greater than the second specified value and sets the value of the color component greater than the second specified value to the second specified value.

According to another aspect of the present invention, there is provided a method of displaying an image signal having first through n-th output color components, including: extracting first through n-th intermediate color components by linearly combining first through m-th input color components, m being less than n; determining whether the m+1-th through n-th intermediate color components are within a specified dynamic range; compensating the first through n-th intermediate color components when signal values of the m+1-th through n-th intermediate color components are not within the dynamic range, to obtain the first through n-th output color components; and emitting light of wavelengths corresponding to the n output color components.

According to another aspect of the present invention, there is provided a color conversion method, including: extracting a CMY signal having cyan (C), magenta (M), and yellow (Y) color components from an input RGB signal having red (R), green (G), and a blue (B) color components by linearly combining the input R, G, and B color components; calculating intermediate color components of the R, G, B, C, M, and Y color components and scaling the intermediate components of the C, M, and Y color components; determining a dynamic range of the scaled C, M, and Y intermediate color components and detecting a signal with a dynamic range which exceeds the detected dynamic range; and compensating the R, G, B, intermediate color components and the scaled C, M, and Y intermediate color components using the detected signal.

According to another aspect of the present invention, there is provided a color conversion method, including: determining first and second coefficient groups usable to extract from an input RGB signal having having red (R), green (G), and blue (B) color components intermediate color components of a CMY signal having cyan (C), magenta (M), and yellow (Y) color components and of an RGB signal having red (R), green (G), and blue (B) color components, the CMY signal and the RGB signal being extracted from the input RGB signal; linearly combining R, G, and B color components of the input R, G, and B signal and, using the first and the second coefficient groups, extracting intermediate color components of the R, G, B, C, M, and Y color components; scaling the intermediate color components of the C, M, and Y color components; determining whether signal values of the scaled intermediate color components are within a specified dynamic range; and compensating at least one of a small color component and a large color component of the scaled intermediate color components when a signal value is determined not to be in the specified range.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
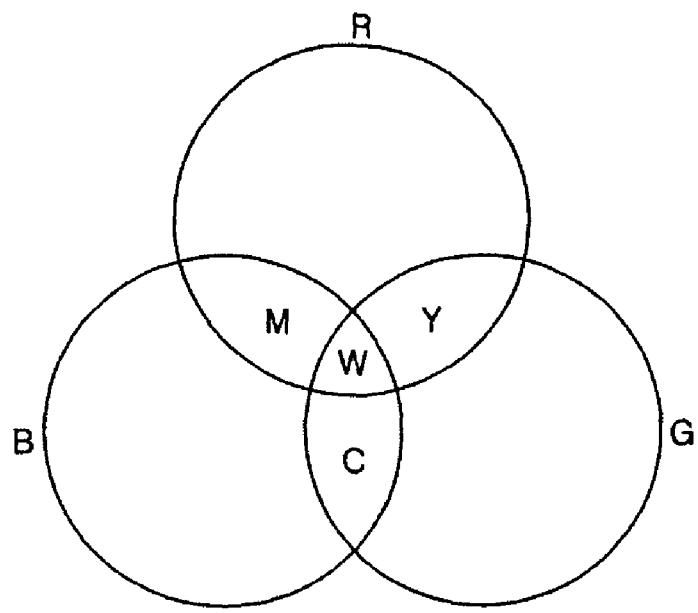
FIG. 1 is a Venn diagram illustrating a relationship among primary colors used for expressing colors.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 5:
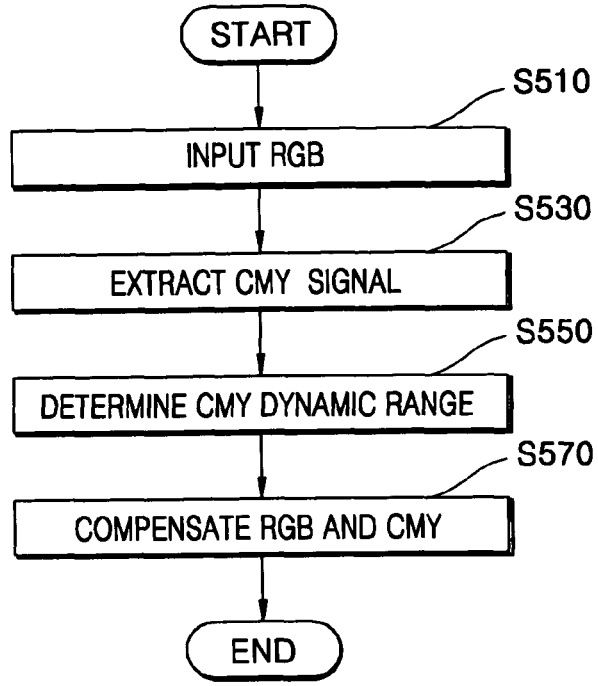
FIG. 5 is a flowchart illustrating a color conversion method according to an embodiment of the present invention.

FIG. 5 is a flowchart illustrating a color conversion method according to an embodiment of the present invention.

In operation S510, an RGB signal is inputted. Then, a CMY signal is extracted from the input RGB signal by linearly combining input color signals in operation S530. Various methods can be used to extract CMY color components, one of which uses equation (1).

$$C = \frac{1}{2}G + \frac{1}{2}B$$
$$M = \frac{1}{2}B + \frac{1}{2}R$$
$$Y = \frac{1}{2}R + \frac{1}{2}G \quad (1)$$

Figure 2:
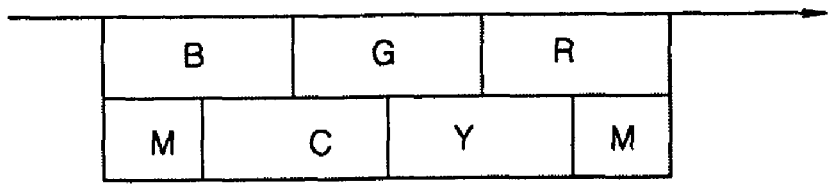
FIG. 2 illustrates a wavelength relationship between RGB and CMY color components.

Equation (1) represents relationships among color components shown in FIG. 1 and FIG. 2.

When the input color component $R_i$, $G_i$ and $B_i$ are ideally processed, then the input color components $R_i$, $G_i$ and $B_i$ and output color components CMY have the relationship shown in equation (1). However, image processing apparatuses have manufacturing variances. Therefore, the input color components $R_i$, $G_i$ and $B_i$ are converted to first through third intermediate color components $R_0$, $G_0$ and $B_0$ using equation (2).

$$R_0 = -p_1 R_i + p_2 G_i + p_3 B_i$$
$$G_0 = q_1 R_i - p_2 G_i + q_3 B_i$$
$$B_0 = r_1 R_i + r_2 G_i - r_3 B_i \quad (2)$$

Further, fourth through sixth intermediate color components $C_1$, $M_1$ and $Y_1$ are calculated from the input color components $R_i$, $G_i$ and $B_i$ using equation (3).

$$C_1 = -a_1 R_i + a_2 G_i + a_3 B_i$$
$$M_1 = b_1 R_i - b_2 G_i + b_3 B_i$$
$$Y_1 = c_1 R_i + c_2 G_i - c_3 B_i \quad (3)$$

When there is no manufacturing variance, (p1, p2, p3)=(−1, −1, 1), (q1, q2, q3)=(1, −1, 1) and (r1, r2, r3)=(1, 1, −1). In addition, (a1, a2, a3)=(0, ½, ½), (b1, b2, b3)=(½, 0, ½) and (c1, c2, c3)=(½, ½, 0) without considering the manufacturing variance.

In the color conversion method according to the present embodiment, the input color components $R_i$, $G_i$ and $B_i$ are compensated (adjusted) in consideration of the manufacturing variance using equations (1) and (2), thus image degradations due to manufacturing variance can be reduced.

As noted from equation (3), a dynamic range of the fourth through sixth intermediate color components $C_1$, $M_1$ and $Y_1$ is wider than that of the input color components $R_i$, $G_i$ and $B_i$. Therefore, the fourth through sixth intermediate color components $C_1$, $M_1$ and $Y_1$ are scaled using equation (4) considering the dynamic range of the fourth through sixth intermediate color components $C_1$, $M_1$ and $Y_1$.

$$C_2 = \text{ratio} \times C_1$$
$$M_2 = \text{ratio} \times M_1$$
$$Y_2 = \text{ratio} \times Y_1 \quad (4)$$

The term "ratio" is a scaling ratio used to scale the fourth through sixth intermediate color components $C_1$, $M_1$ and $Y_1$ in equation (4) and can be calculated in various ways. In a color conversion method according to an embodiment of the present invention, however, the scaling ratio is calculated so that it is complementary to grayscale of the input color components $R_i$, $G_i$ and $B_i$. The calculation of the scaling ratio will be described in more detail with reference to FIG. 7.

When the first through sixth intermediate color components $R_0$, $G_0$, $B_0$, $C_2$, $M_2$ and $Y_2$ are calculated, a dynamic range of the scaled fourth through sixth intermediate color components $C_2$, $M_2$ and $Y_2$ is determined in operation S550. In operation S550, a signal whose dynamic range exceeds a specified range is detected.

Figure 3:
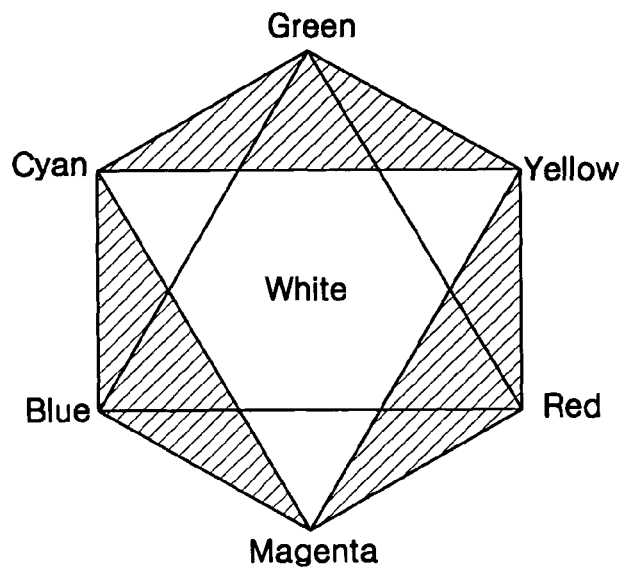
FIG. 3 is a color diagram of RGB and CMY color components.
Figure 4A:
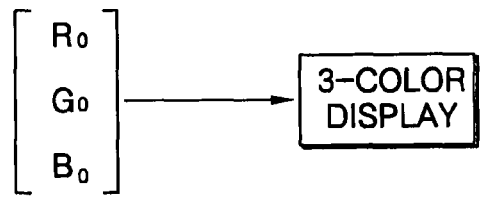
FIG. 4A schematically illustrates the operation of a conventional 3-color display.
Figure 4B:
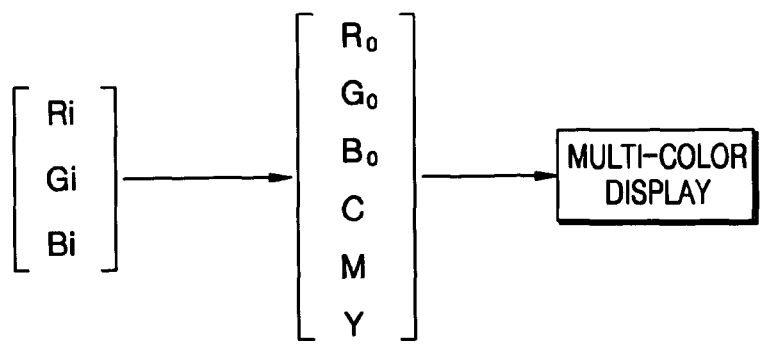
FIG. 4B schematically illustrates the operation of a conventional multi-color display apparatus.

Then, the first through sixth intermediate color components $R_0$, $G_0$, $B_0$, $C_2$, $M_2$ and $Y_2$ are compensated by using the signal whose dynamic range exceeds the specified range in operation S570. A color region which cannot be represented using three primary colors as shown in a dashed area in FIG. 3, by way of a non-limiting example, can be represented through the operation S570.

In the color conversion method according to the present embodiment an algorithm is used to perform the compensating operation S570. The compensating operation S570 will be described in detail with reference to FIG. 8.

Figure 6:
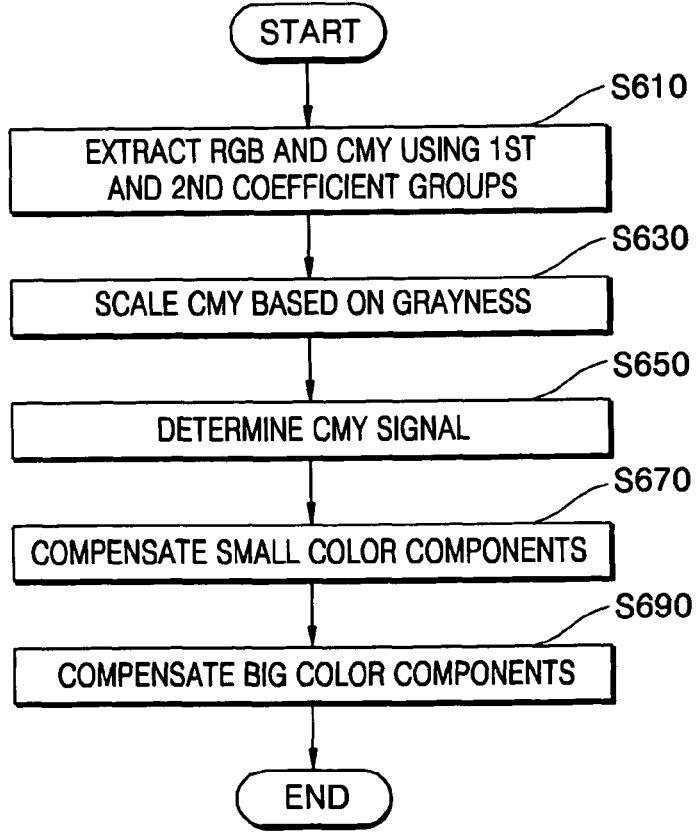
FIG. 6 is a flowchart illustrating a color conversion method according to another embodiment of the present invention.

FIG. 6 is a flowchart illustrating a color conversion method according to another embodiment of the present invention.

First, first and second coefficient groups used to calculate the first through sixth intermediate color components $R_0$, $G_0$, $B_0$, $C_1$, $M_1$ and $Y_1$ by linearly combining the input color components $R_i$, $G_i$ and $B_i$ are determined in operation S610. As noted above, the first and second coefficient groups can be determined considering manufacturing variances.

Then, the grayscale of the input color components $R_i$, $G_i$ and $B_i$ is calculated and a scaling ratio for scaling the fourth through sixth intermediate color components $C_1$, $M_1$ and $Y_1$ is determined in operation S630. In operation S630, all of the RGB color components and the CMY color components are used to produce achromatic colors, while the chromaticness of each input color is scaled when the chromaticness increases.

The grayscale can be calculated using various methods. In the embodiment illustrated in FIG. 6, the grayscale is calculated using equation (5).

$$\text{Grayscale} = \{\max[RGB] - \min[RGB]\} / \max[RGB] \quad (5)$$

The scaling ratio has a relationship complementary to the grayscale given by equation (5), as shown by equation (6).

$$\text{ratio} = 1 - p^* \text{grayscale} \quad (6)$$

In equation (6), p is an arbitrary constant which depends on the relationship between the grayscale and the scaling ratio.

Figure 7:
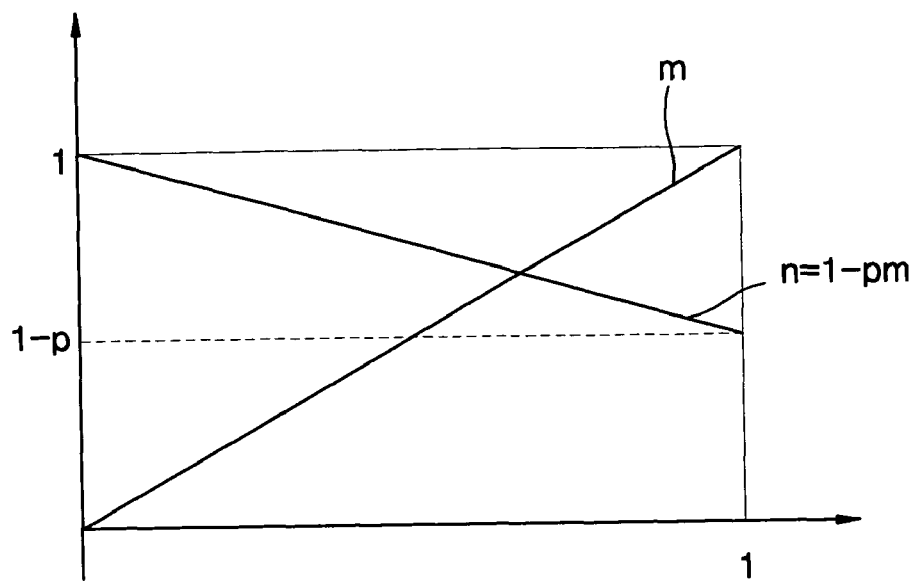
FIG. 7 is a graph showing a relationship between a scaling ratio and a grayscale used in an intermediate color component extracting operation according to an aspect of the present invention.

FIG. 7 is a graph showing the relationship between the scaling ratio and the grayscale used in an intermediate color component extracting operation according to an embodiment of the present invention.

Referring to FIG. 7, the scaling ratio (n) lies within a range [1−p, 1] when the grayness m is in a range [0,1]. For example, when p=0.5, the scaling ratio n lies in the range [0.5, 1]. By determining the scaling ratio, which is complementary to the grayness, as illustrated in FIG. 7, the chromaticnesses of the fourth through sixth intermediate color components $C_1$, $M_1$ and $Y_1$ can be reduced when they exceed a specified range.

Returning to FIG. 6, after scaling the fourth through sixth intermediate color components $C_1$, $M_1$ and $Y_1$, it is determined whether signal values of scaled fourth through sixth intermediate color components $C_2$, $M_2$ and $Y_2$ lie within a specified dynamic range in operation S650. For example, when each color component has a dynamic range of [0, 1], then it is determined whether the scaled fourth through sixth intermediate color components $C_2$, $M_2$ and $Y_2$ lie within [0, 1].

When one of the scaled fourth through sixth intermediate color components $C_2$, $M_2$ and $Y_2$ has a value less than a minimum value (0, for example) of the dynamic range, it means that the color component (small color component, hereinafter) cannot be represented by only using the scaled fourth through sixth intermediate color components $C_2$, $M_2$ and $Y_2$. In addition, when one of CMY color components is less than 0, it means that the color represented by the input color components $R_i$, $G_i$ and $B_i$ is close to pure R, G, or B. Therefore, a small color component compensating operation is performed to produce a signal representing the small color component in operation S670.

In operation S670, the chromaticnesses of other color components are increased using an absolute value of the small color component and a color coordinate of the small color component is moved by using a color component (complementary color component) which is complementary to the small color component. The operation S670 is described with reference to FIG. 8.

Figure 8:
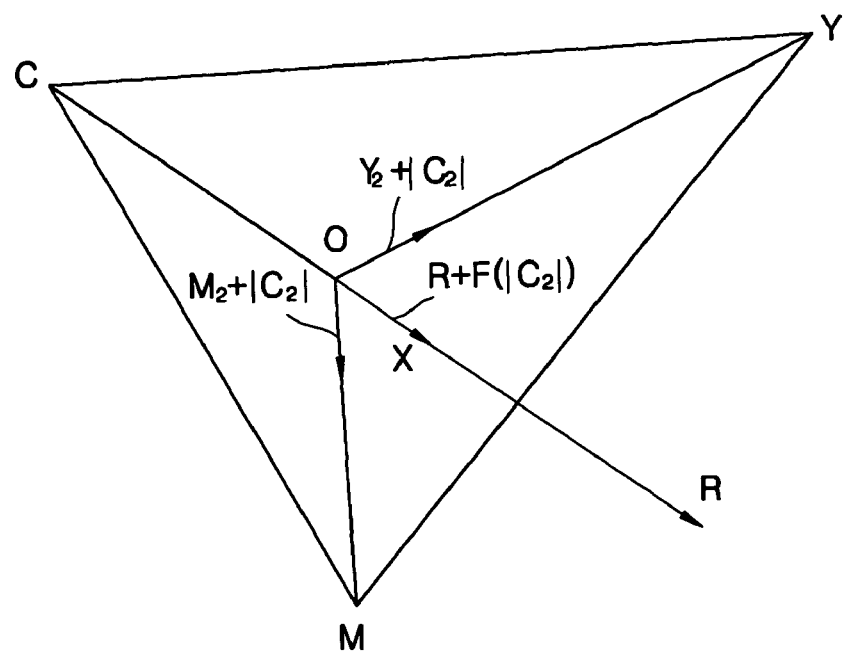
FIG. 8 schematically illustrates a color component compensating operation according to an embodiment of the present invention.

FIG. 8 schematically illustrates a color component compensating operation according to an embodiment of the present invention. Referring to FIG. 8, a color component C is assumed to be a small color component having a negative value of $C_2$. Since color components cannot have negative values, a negative color component refers to a color component that cannot be represented using M and Y components. Therefore, a point X is expressed using an R component which is complementary to the C component. That is, the original point O is moved in a direction toward R, which is complementary to C, as well as in directions to M and Y by an absolute value of $C_2$. The origin O can be moved toward the R component by a value obtained by applying an extraction function F(x) to the absolute value of the C component, rather than by the absolute value itself.

Equation (7) shows how the color components are adjusted.

when $C_2 < 0$, $M_3 = M_2 + |C_2|$, $Y_3 = Y_2 + |C_2|$, $C_3 = 0$, $R = R + F(|C_2|)$ \hfill (7)

As known from equation (7), the M and Y color components $M_2$ and $Y_2$ are moved toward M and Y by $|C_2|$ respectively, while the R component is moved toward R, which is complementary to C, by $F(|C_2|)$ when $C_2$ is the small color component.

Similarly, equation (8) is obtained when $M_2$ and $Y_2$ are the small color components, respectively.

when $M_2 < 0$, $C_3 = C_2 + |M_2|$, $Y_3 = Y_2 + |M_2|$, $M_3 = 0$, $G = G + F(|M_2|)$ when $Y_2 < 0$, $C_3 = C_2 + |Y_2|$, $M_3 = M_2 + |Y_2|$, $Y_3 = 0$, $B = B + F(|Y_2|)$ \hfill (8)

Returning to FIG. 6, after the small color component is compensated as above, then it is determined whether one of the compensated fourth through sixth intermediate color components $C_2$, $M_2$ and $Y_2$ has a value greater than a maximum value of the dynamic range (for example, 1) in operation S690. The color component, which is greater than a specified maximum value (big color component, hereinafter), is to be clipped because it cannot be displayed. Therefore, to prevent clipping, the big color component is set to the maximum value and the remaining components are compensated using the big color component. For example, when the C component is greater than 1, the other color components are compensated using equation (9).

$$\text{when } C_2 > 1,\ M_3 = \frac{M_2}{C_2},\ Y_3 = \frac{Y_2}{C_2},\ C_3 = 1 \qquad (9)$$

As in equation (9), color distortion is reduced since all of the $C_2$, $M_2$ and $Y_2$ color components are scaled by the same ratio($C_2$).

In a similar way, equation (10) is obtained when $M_2$ and $Y_2$ are the big color components, respectively.

$$\text{when } M_2 > 1,\ C_3 = \frac{C_2}{M_2},\ Y_3 = \frac{Y_2}{M_2},\ C_3 = 1 \qquad (10)$$

$$\text{when } Y_2 > 1,\ C_3 = \frac{C_2}{Y_2},\ M_3 = \frac{M_2}{Y_2},\ Y_3 = 1$$

The image quality is improved by using the method illustrated in FIG. 7 since not only the CMY color components are compensated based on the grayscale, but also small and big color components are compensated when one of the scaled CMY color components is not within a specified dynamic range.

Figure 9:
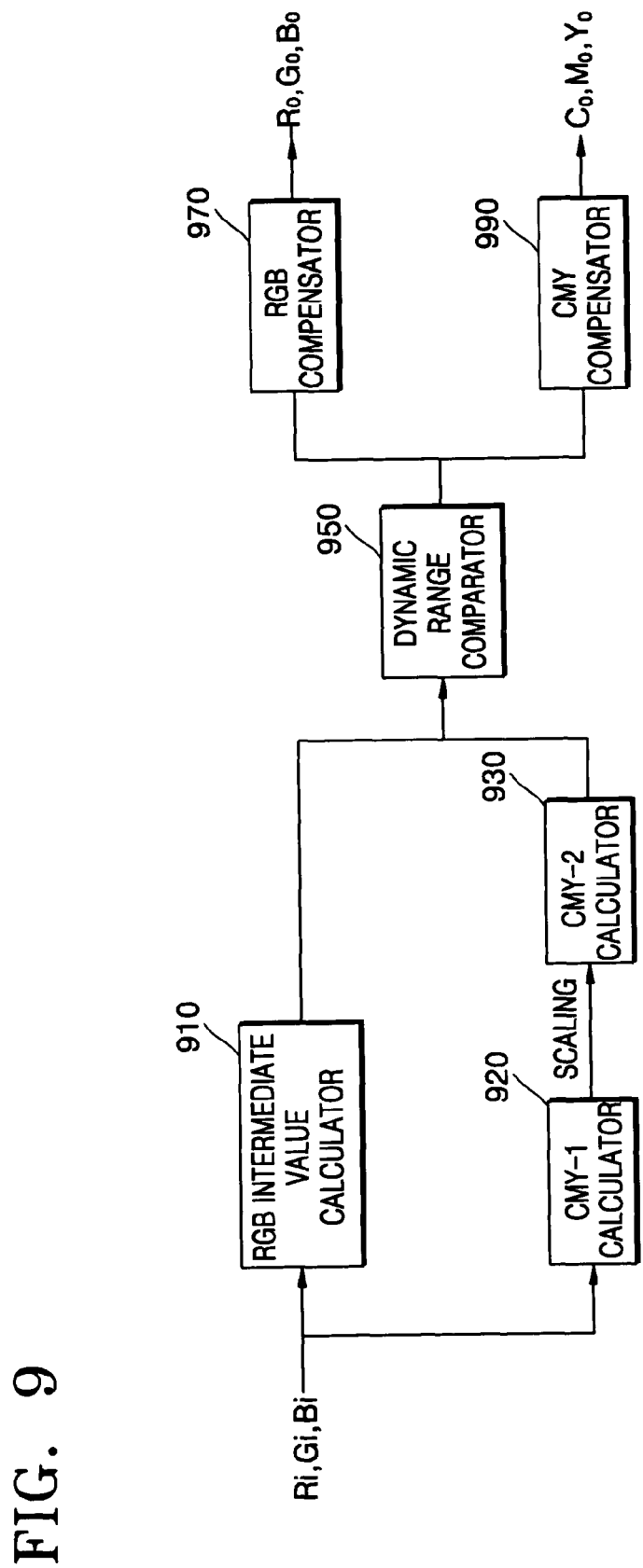
FIG. 9 is a block diagram of a color conversion apparatus according to an embodiment of the present invention and FIG. 10 is a block diagram of a multi-color display apparatus according to an embodiment of the present invention.

FIG. 9 is a block diagram of a color conversion apparatus according to an embodiment of the present invention.

First, first through third intermediate color components $R_0$, $G_0$ and $B_0$ and fourth through sixth intermediate color components $C_1$, $M_1$ and $Y_1$ are calculated from the input color components $R_i$, $G_i$ and $B_i$ by an RGB intermediate value calculator 910 and the CMY-1 calculator 920, respectively.

Then, the fourth through sixth intermediate color components $C_1$, $M_1$ and $Y_1$ are scaled to obtain scaled fourth through sixth intermediate color components $C_2$, $M_2$ and $Y_2$ by an CMY-2 calculator 930. The CMY-2 calculator 930 calculates the grayscale of the input color components $R_i$, $G_i$ and $B_i$ and scales the fourth through sixth intermediate color components $C_1$, $M_1$ and $Y_1$ according to a scaling ratio which is complementary to the calculated grayness.

A dynamic range comparator 950 determines whether the dynamic ranges of the scaled fourth through sixth intermediate color components $C_2$, $M_2$ and $Y_2$ exceed a specified dynamic range. Then, an RGB compensator 970 and an CMY compensator 990 compensates the color components which are smaller or greater than the specified dynamic range to obtain output color components $R_0$, $G_0$, $B_0$, $C_0$, $M_0$ and $Y_0$.

Referring to FIG. 9, the color conversion apparatus according to the present embodiment can be relatively easy to implement since it uses an algorithm to compensate the scaled fourth through sixth intermediate color components $C_2$, $M_2$ and $Y_2$ when they are not within the specified dynamic range.

Figure 10:
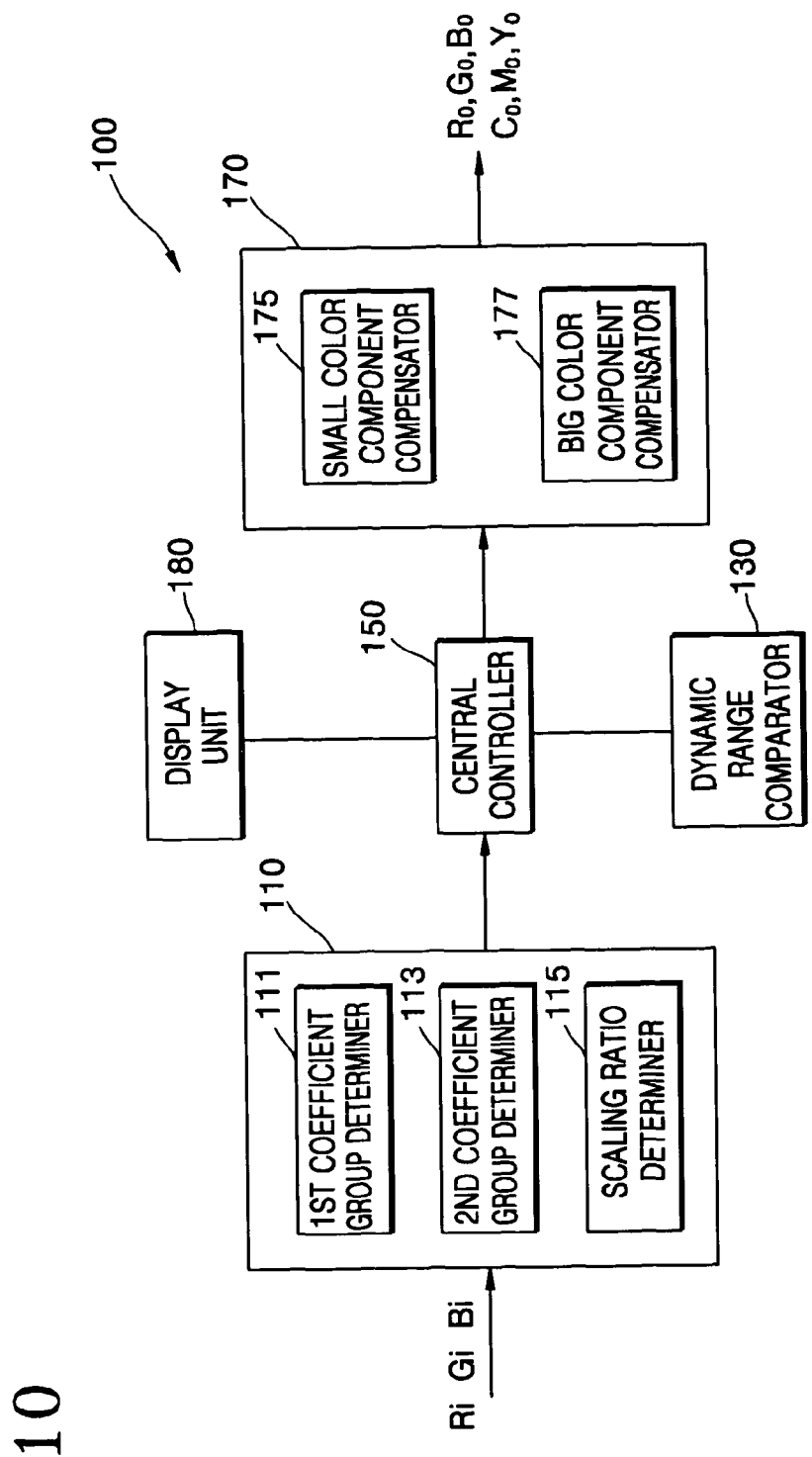

FIG. 10 is a block diagram of a multi-color display apparatus according to an embodiment of the present invention.

The multi-color display apparatus 100 shown in FIG. 10 includes an intermediate color component extractor 110, a dynamic range comparator 130, a color component compensator 170, a central controller 150 and a display unit 180.

The intermediate color component extractor 110 extracts a plurality of intermediate color components by linearly combining input color components $R_i$, $G_i$ and $B_i$. The intermediate color component extractor 110 includes a first coefficient group determiner 111 and a second coefficient group determiner 113, which determines coefficient groups used for combining the RGB and CMY signals from the input color components $R_i$, $G_i$ and $B_i$, respectively. A scaling ratio used for scaling the fourth through sixth intermediate color components $C_1$, $M_1$ and $Y_1$, which are obtained using the coefficient group determined in the second coefficient group determiner 113, is determined in the scaling ratio determiner 115. As noted above, the scaling ratio can be complementary to the grayscale of the input color components $R_i$, $G_i$ and $B_i$.

The dynamic range comparator 130 compares signal values of the scaled fourth through sixth intermediate color components $C_2$, $M_2$ and $Y_2$ with a specified dynamic range. When more than one of the scaled fourth through sixth intermediate color components $C_2$, $M_2$ and $Y_2$ are not within the specified dynamic range, the color component compensator 170 compensates the signal values.

The color component compensated by the color component compensator 170 is displayed by the display unit 180. The display unit 180 includes a plurality of optical sources (not shown) respectively corresponding to RGB and CMY color components. The image quality is improved by using the display unit 180 having the plurality of optical sources.

The central controller 150 controls the operations of the intermediate color component extractor 110, the dynamic range comparator 130, the color component compensator 170 and the display unit 180.

The color component compensator 170 includes a small color component compensator 175 and a big color component compensator 177. The small color component compensator 175 compensates the first through sixth intermediate color components using an absolute value of a small color component when one of the scaled fourth through sixth intermediate color components $C_2$, $M_2$ and $Y_2$ is less than a specified minimum value. The big color component compensator 177 compensates one of the scaled fourth through sixth intermediate color components $C_2$, $M_2$ and $Y_2$ using a big color component when one of the scaled fourth through sixth intermediate color components $C_2$, $M_2$ and $Y_2$ is greater than a specified maximum value. As noted above, the small color component compensator 175 uses an absolute value of the small color component (for example, $C_2$) to increase other color components ($M_2$, $Y_2$), and moves the color coordinates away from the small color component toward a complementary color component (R).

Then, the big color component compensator 177 determines whether one of the compensated fourth through sixth intermediate color components $C_2$, $M_2$ and $Y_2$ has a value greater than a maximum value (for example, 1) of the dynamic range. To prevent color clipping of the big color component (for example, $C_2$), the big color component $C_2$ is set to the maximum value and the other color components are compensated using the big color component as described above.

At least the above-described embodiments of the present invention provide a simplified method and apparatus for converting an input color space to a higher-dimensional output color space.

At least the above-described embodiments of the present invention also provide a color space converting apparatus which can express colors with a maximum saturation and brightness of a display.

At least the above-described embodiments of the present invention also provide a display apparatus displaying output color components included in a higher-dimensional color space converted from an input color space.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of converting an m-dimensional color space having first through m-th input color components into an n-dimensional color space having first through n-th output color components, m being less than n, the method comprising:
    extracting, using at least one processing device, respective first through m-th intermediate color components and extracting respective m+1-th through n-th intermediate color components by linearly combining the first through m-th input color components;
    analyzing the m+1-th through n-th intermediate color components determining whether m+1-th through n-th intermediate color components are within a specified dynamic range for the m+1-th through n-th output color components; and
    compensating the first through n-th intermediate color components, to obtain the first through n-th output color components, based on a result of the analyzing and consideration of a dynamic range of the m+1-th through n-th intermediate color components being different from a dynamic range of the first through m-th input color components.

2. The method of claim 1, wherein the extracting the first through n-th intermediated color components includes:
    determining a first coefficient group used to calculate the first through m-th intermediate color components by linearly combining the first through m-th input color components;
    determining a second coefficient group used to calculate the m+1-th through n-th intermediate color components by linearly combining the first through m-th input color components; and
    calculating the first through n-th intermediate color components using the first through m-th input color components and the first and second coefficient groups.

3. The method of claim 2, wherein the calculating the first through n-th intermediate color component includes:
    calculating the dynamic range of the m+1-th through n-th intermediate color components;
    determining a scaling ratio for scaling the dynamic range of the m+1-th through n-th intermediate color components; and
    scaling the m+1-th through n-th intermediate color components using the scaling ratio.

4. The method of claim 3, wherein the determining the scaling ratio includes:
    determining the grayscale of the first through m-th input color components using a specified algorithm; and
    determining the scaling ratio such that the scaling ratio is complementary to the grayscale.

5. The method of claim 4, wherein the grayscale is calculated by ((the maximum of the first through m-th input color components) minus (the minimum of the first through m-th input color components)) divided by the maximum of the first through m-th input color components, and the scaling ratio is calculated using (1−p*grayness), wherein p satisfies 0<p<1.

6. The method of claim 1, wherein the compensating the first through n-th intermediate color components includes:
when more than one of the m+1-th through n-th intermediate color components are less than a first specified value, compensating the color components less than the first specified value; and
when more than one of the m+1-th through n-th intermediate color components are greater than a second specified value, compensating the color components greater than the second specified value.

7. The method of claim 6, wherein the compensating the color components less than the first specified value includes:
adding the absolute value of the color component less than the first specified value to the m+1-th through n-th intermediate color components;
adding the absolute value of the color component less than the first specified value to a complementary color component which is complementary to the color component less than the first specified value; and
setting the value of the color component less than the first specified value to the first specified value.

8. The method of claim 6, wherein the compensating the color components greater than the second specified value includes:
dividing values of the m+1-th through n-th intermediate color components by the value of the color component greater than the second specified value; and
setting the value of the color component greater than the second specified value to the second specified value.

9. The method of claim 1, wherein the first through m-th input color components are RGB color components (m=3), and the m+1-th through n-th output color components are CMY color components (n=6) obtained by applying a conversion matrix, [0 ½ ½; ½ 0 ½; ½ ½ 0], to a vector comprising the first through m-th input color components.

10. An apparatus for converting an m-dimensional color space having first through m-th input color components to an n-dimensional color space having first through n-th output color components, m being less than n, comprising:
an intermediate color component extractor extracting respective first through m-th intermediate color components and extracting respective m+1-th through n-th intermediate color components by linearly combining the first through m-th input color components;
a dynamic range comparator analyzing the m+1-th through n-th intermediate color components determining whether the m+1-th through n-th intermediate color components are within a specified dynamic range for the m+1-th through n-th output color components; and
a color component compensator compensating the first through n-th intermediate color components, to obtain the first through n-th output color components, based on a result of the analyzing and consideration of a dynamic range of the m+1-th through n-th intermediate color components being different from a dynamic range of the first through m-th input color components.

11. The apparatus of claim 10, wherein the intermediate color component extractor includes:
a first coefficient group determiner determining a first coefficient group used to calculate the first through m-th intermediate color components by linearly combining the first through m-th input color components; and
a second coefficient group determiner determining a second coefficient group used to calculate the m+1-th through n-th intermediate color components by linearly combining the first through m-th input color components, new line, and the central controller calculates the first through n-th intermediate color components using the first through m-th input color components and the first and second coefficient groups.

12. The apparatus of claim 11, wherein the intermediate color component extractor further comprises a scaling ratio determiner determining a scaling ratio for scaling the dynamic range of the m+1-th through n-th intermediate color components and the central controller scales the m+1-th through n-th intermediate color components using the scaling ratio.

13. The apparatus of claim 12, wherein the scaling ratio determiner determines the grayscale of the first through m-th input color components using a specified algorithm and determines the scaling ratio such that the scaling ratio is complementary to the grayscale.

14. The apparatus of claim 13, wherein the grayscale is calculated using (the maximum of the first through m-th input color components—the minimum of the first through m-th input color components) divided by the maximum of the first through m-th input color components, and the scaling ratio is calculated using (1−p*grayness), where p satisfies 0<p<1.

15. The apparatus of claim 10, wherein the color component compensator includes:
a small color component compensator compensating color components less than the first specified value when more that one of the m+1-th through n-th intermediate color components are less than a first specified value; and
a big color component compensator compensating color components greater than the second specified value when more that one of the m+1-th through n-th intermediate color components are greater than a second specified value.

16. The apparatus of claim 15, wherein the small color component compensator adds the absolute value of the color component less than the first specified value to the m+1-th through n-th intermediate color components, adds the absolute value of the color component less than the first specified value to a complementary color component complementary to the color component less than the first specified value and sets the value of the color component less than the first specified value to the first specified value.

17. The apparatus of claim 15, wherein the big color component compensator divides values of the m+1-th through n-th intermediate color components by a value of the color component greater than the second specified value and sets the value of the color component greater than the second specified value to the second specified value.

18. The apparatus of claim 10, wherein the first through m-th input color components are RGB color components (m=3), and the m+1-th through n-th output color components are CMY color components (n=6) obtained by applying a conversion matrix, [0 ½ ½; ½ 0 ½; ½ ½ 0], to a vector comprising the first through m-th input color components.

19. A color display apparatus for displaying an image signal having first through n-th output color components, comprising:
an intermediate color component extractor extracting respective first through m-th intermediate color components and extracting respective m+1-th through n-th intermediate color components by linearly combining first through m-th input color components, m being less than n;

a dynamic range comparator analyzing the m+1-th through n-th intermediate color components determining whether the m+1-th through n-th intermediate color components are within a specified dynamic range for the m+1-th through n-th output color components;

a color component compensator compensating the first through n-th intermediate color components, to obtain the first through n-th output color components, based on a result of the analyzing and consideration of a dynamic range of the m+1-th through n-th intermediate color components being different from a dynamic range of the first through m-th input color components; and a display unit including n optical sources emitting light of wavelengths corresponding to the n output color components.

20. The apparatus of claim 19, wherein the intermediate color component extractor includes:

a first coefficient group determiner determining a first coefficient group used to calculate the first through m-th intermediate color components by linearly combining the first through m-th input color components;

a second coefficient group determiner determining a second coefficient group used to calculate the m+1-th through n-th intermediate color components by linearly combining the first through m-th input color components; and a scaling ratio determiner determining a scaling ratio used to scale the dynamic range of the m+1-th through n-th intermediate color components, wherein the central controller calculates the first through n-th intermediate color components using the first through m-th input color components and the first and second coefficient groups, and scales the m+1-th through n-th intermediate color components by using the scaling ratio.

21. The apparatus of claim 20, wherein the scaling ratio determiner determines the grayscale of the first through m-th input color components by ((the maximum of the first through m-th input color components) minus (the minimum of the first through m-th input color components)) divided by the maximum of the first through m-th input color components, and the scaling ratio is calculated using $(1-p*grayness)$, wherein p satisfies $0<p<1$.

22. The apparatus of claim 19, wherein the color component compensator includes:

a small color component compensator compensating color components less than the first specified value when more that one of the m+1-th through n-th intermediate color components are less than a first specified value; and a big color component compensator compensating color components greater than the second specified value when more that one of the m+1-th through n-th intermediate color components are greater than a second specified value.

23. The apparatus of claim 22, wherein the small color component compensator adds the absolute value of the color component less than the first specified value to the m+1-th through n-th intermediate color components, adds the absolute value of the color component less than the first specified value to a complementary color component complementary to the color component less than the first specified value and sets the value of the color component less than the first specified value to the first specified value.

24. The apparatus of claim 22, wherein the big color component compensator divides values of the m+1-th through n-th intermediate color components by a value of the color component greater than the second specified value and sets the value of the color component greater than the second specified value to the second specified value.

25. The apparatus of claim 19, wherein the first through m-th input color components are RGB color components (m=3), and the m+1-th through n-th output color components are CMY color components (n=6) obtained by applying a conversion matrix, $[0\ \frac{1}{2}\ \frac{1}{2};\ \frac{1}{2}\ 0\ \frac{1}{2};\ \frac{1}{2}\ \frac{1}{2}\ 0]$, to a vector comprising the first through m-th input color components.

26. A method of displaying an image signal having first through n-th output color components, the method comprising:

extracting, using at least one processing device, respective first through m-th intermediate color components and extracting respective m+1-th through n-th intermediate color components by linearly combining first through m-th input color components, m being less than n;

analyzing the m+1-th through n-th intermediate color components determining whether the m+1-th through n-th intermediate color components are within a specified dynamic range for the m+1-th through n-th output color components;

compensating the first through n-th intermediate color components, to obtain the first through n-th output color components, based on a result of the analyzing and consideration of a dynamic range of the m+1-th through n-th intermediate color components being different from a dynamic range of the first through m-th input color components; and emitting light of wavelengths corresponding to the n output color components.

27. A color conversion method, the method comprising:

extracting, using at least one processing device, a CMY signal having cyan (C), magenta (M), and yellow (Y) color components from an input RGB signal having red (R), green (G), and a blue (B) color components by linearly combining the input R, G, and B color components;

calculating respective intermediate color components of the R, G, B, C, M, and Y color components and scaling the respective intermediate components of the C, M, and Y color components;

determining at least one dynamic range of the scaled C, M, and Y intermediate color components, and analyzing at least one of the scaled C, M, and Y intermediate color components to detect a signal with a dynamic range which exceeds the determined dynamic range, which is a dynamic range for the m+1-th through n-th output color components; and compensating at least one of the R, G, B, intermediate color components and at least one of the scaled C, M, and Y intermediate color components using the detected signal based upon consideration of a dynamic range of the C, M, and Y intermediate color components being different from a dynamic range of the input R, G, and B color components.

28. A color conversion method, the method comprising:

determining first and second coefficient groups usable to extract from an input RGB signal having red (R), green (G), and blue (B) color components intermediate color components of a CMY signal having cyan (C), magenta (M), and yellow (Y) color components and of an RGB signal having red (R), green (G), and blue (B) color components, the CMY signal and the RGB signal being extracted from the input RGB signal;

linearly combining, using at least one processing device, R, G, and B color components of the input R, G, and B signal and, using the first and the second coefficient groups, to extract intermediate color components of the R, G, B, C, M, and Y color components;

scaling the intermediate color components of the C, M, and Y color components;

analyzing the scaled intermediate color components of the C, M, and Y color components determining whether signal values of the scaled intermediate color components of the C, M, and Y color components are within a specified dynamic range for the m+1-th through n-th output color components; and compensating at least one of the intermediate color components of the R, G, and B color components and at least one of the scaled intermediate color components of the C, M, and Y color components based on at least one of a small color component and a large color component of the scaled intermediate color components based on a result of the analyzing and consideration of a dynamic range of the m+1-th through n-th intermediate color components being different from a dynamic range of the first through m-th input color components.

29. A method of converting an m-dimensional color space having first through m-th input color components into an n-dimensional color space having first through n-th output color components, m being less than n, the method comprising:

extracting, using at least one processing device, first through n-th intermediate color components by linearly combining the first through m-th input color components, including performing a compensating of the first through m-th input color components to generate the first through m-th intermediate color components thereby reducing image degradations due to manufacturing variances; and compensating the first through n-th intermediate color components based on an analyzing of the m+1-th through n-th intermediate color components determining that signal values of the m+1-th through n-th intermediate color components are not within a specified dynamic range for the m+1-th through n-th output color components, wherein a dynamic range of the m+1-th through n-th intermediate color components is different from a dynamic range of the first through m-th input color components.

30. A method, the method comprising:

analyzing at least one of an m+1-th through n-th intermediate color components, of respectively extracted first through m-th and m+1-th through n-th intermediate color components, with the analyzing determining whether the at least one m+1-th through n-th intermediate color components includes a signal value outside a specified dynamic range for the m+1-th through n-th output color components; and compensating, using at least one processing device, at least one of the first through m-th intermediate color components, to obtain the first through n-th output color components, based on a result of the analyzing and consideration of a dynamic range of the m+1-th through n-th intermediate color components being different from a dynamic range of the first through m-th input color components.

31. The method of claim 30, wherein the compensating of the at least one of the first through m-th intermediate color components further comprises compensating of the at least one of the m+1 through n-th intermediate color components based on the determining.

32. The method of claim 30, further comprising scaling the extracted m+1-th through n-th intermediate color components based on a scaling ratio derived from a determined grayscale of the extracted first through m-th intermediate components, and wherein the determining comprises determining whether at least one of the scaled m+1-th through n-th intermediate color components is within the specified dynamic range.

* * * * *

UNITED STATES PATENT AND TRADEMARK OFFICE
CERTIFICATE OF CORRECTION

PATENT NO. : 8,274,527 B2  
APPLICATION NO. : 11/064951  
DATED : September 25, 2012  
INVENTOR(S) : Hyunwook Ok et al.

Page 1 of 1

It is certified that error appears in the above-identified patent and that said Letters Patent is hereby corrected as shown below:

Title Page, Item (57) (Abstract); Line 4; Delete "components. specified A" and insert -- components specified. A --, therefor.

Title Page, Item (57) (Abstract); Line 8; Delete "nth" and insert -- n-th --, therefor.

In the Claims

Column 14; Line 34; In Claim 15, delete "that" and insert -- than --, therefor.
Column 14; Line 38; In Claim 15, delete "that" and insert -- than --, therefor.
Column 15; Line 50; In Claim 22, delete "that" and insert -- than --, therefor.
Column 15; Line 54; In Claim 22, delete "that" and insert -- than --, therefor.

Signed and Sealed this
Fourteenth Day of May, 2013

Teresa Stanek Rea
*Acting Director of the United States Patent and Trademark Office*